(12) United States Patent
Schneider (10) Patent No.: US 8,303,163 B2
(45) Date of Patent: Nov. 6, 2012

(54) IN-LINE MIXING APPARATUS FOR IODINE EXTRACTION

(76) Inventor: Charles A. Schneider, Union, KY (US)

(*) Notice: Subject to any disclaimer, the term of this patent is extended or adjusted under 35 U.S.C. 154(b) by 231 days.

(21) Appl. No.: 12/617,298

(22) Filed: Nov. 12, 2009

(65) Prior Publication Data

US 2011/0110845 A1   May 12, 2011

(51) Int. Cl.
*B01F 5/04* (2006.01)
(52) U.S. Cl. ............... 366/173.1; 366/175.2; 366/181.5
(58) Field of Classification Search ............. 366/173.1, 366/173.2, 174.1, 175.2, 167.1, 176.1–176.4, 366/162.4, 181.5, 336–340; 137/896
See application file for complete search history.

(56) References Cited

U.S. PATENT DOCUMENTS

| | | | | |
|---|---|---|---|---|
| 1,676,237 A | * | 7/1928 | Baker | 48/189.4 |
| 2,747,844 A | * | 5/1956 | Slayter | 366/167.1 |
| 3,147,717 A | * | 9/1964 | Smith | 425/131.1 |
| 3,266,437 A | * | 8/1966 | Blackmore et al. | 138/41 |
| 3,475,508 A | * | 10/1969 | King | 585/403 |
| 3,818,938 A | * | 6/1974 | Carson | 366/167.1 |
| 4,043,539 A | * | 8/1977 | Gilmer et al. | 366/340 |
| 4,189,243 A | * | 2/1980 | Black | 366/336 |
| 5,460,449 A | | 10/1995 | Kent et al. | |
| 5,510,019 A | * | 4/1996 | Yabumoto et al. | 210/137 |
| 5,597,236 A | * | 1/1997 | Fasano | 366/181.5 |
| 6,074,085 A | * | 6/2000 | Scarpa et al. | 366/101 |
| 2010/0119438 A1 | * | 5/2010 | Becker et al. | 423/501 |
| 2011/0108486 A1 | * | 5/2011 | Schneider et al. | 210/668 |
| 2011/0110845 A1 | * | 5/2011 | Schneider | 423/500 |

OTHER PUBLICATIONS

Annex to Form PCT/ISA/206, Communication Relating to the Results of the Partial International Search, 2 pages.
International Search Report and Written Opinion, mailed Nov. 8, 2010, 21 pgs.

* cited by examiner

*Primary Examiner* — Charles E Cooley
(74) *Attorney, Agent, or Firm* — Richard M. Klein; Fay Sharpe LLP (57) ABSTRACT

An in-line mixing apparatus is especially useful for iodine extraction from brine. Three fluids (brine, an oxidant such as sodium hypochlorite, and an acid such as HCl) are mixed in the apparatus. The apparatus includes an inner tube and an outer tube. Openings are present in the sidewall of the inner tube to connect the interior volume of the inner tube with the annular volume between the inner tube and the outer tube. Fluid is passed into the inner tube and flows through the openings into the annular volume, causing immediate and vigorous mixing and chemical reaction to obtain elemental iodine.

16 Claims, 4 Drawing Sheets

IN-LINE MIXING APPARATUS FOR IODINE EXTRACTION

BACKGROUND

The present disclosure relates to an in-line mixing apparatus which is especially suitable for use in processes for extracting iodine from an aqueous solution containing soluble iodine ions such as iodide. Also included are various processes for extracting iodine from aqueous solutions using such an apparatus.

Elemental iodine ($I_2$) is a valuable chemical having many industrial and medicinal applications. There is an increasing demand for iodine and its major derivatives, iodide salts. The consumption of iodine and iodide salts is distributed among several industrial applications, such as catalysts, animal feed additives, stabilizers for nylon resins, inks and colorants, pharmaceuticals, disinfectants, film, and other uses. A great deal of attention is therefore focused on the recovery of iodine from various sources, either as a primary product or as a by-product of other industrial processes.

Iodine is generally recovered by physical and/or chemical manipulation of an aqueous solution containing soluble iodine ions like iodide ($I^{1-}$) or iodate ($IO_3^{1-}$). Exemplary solutions include leaching solutions used in nitrate extraction and brine solutions. The term "brine" in this context includes industrial and naturally occurring salt solutions containing iodine in various salt forms. Exemplary brines are seawater and natural brines such as those associated with petroleum deposits and with solution mining of salt domes.

It has been known to extract iodine from aqueous solutions containing iodide, such as brine, by acidification with a mineral acid and thereafter adding an oxidant such as chlorine to liberate the iodine. This extraction is described in U.S. Pat. No. 3,346,331 to Nakamura. The reference further discloses the use of an anion-exchange resin to adsorb iodine from brine. Nakamura also discloses alternating passage over the anion-exchange resin of the iodide-containing solution, which has chlorine added to it, with the iodide-containing solution without the added chlorine. This cycle repeats until the resin is saturated. Finally the resin is treated with sodium hydroxide solution followed by a sodium chloride solution to elute iodine from the resin in the form of iodide ($I^{1-}$) and iodate ($IO_3^{1-}$). The iodine in the combined eluents is recovered by adding mineral acid to convert iodide and iodate to iodine, which will crystallize out.

U.S. Pat. No. 4,131,645 to Keblys discloses a system of iodine recovery similar to that of Nakamura. Keblys discloses passing brine through an anion-exchange resin without acidification or oxidation, whereby the resin adsorbs iodide from the brine. The adsorbed iodide is then oxidized by passing a separately prepared aqueous iodate solution through the resin. The aqueous iodate solution is acidified with hydrochloric acid to a pH of about 1-4 before use. Keblys discloses repeating cycles of passing brine then passing acidified aqueous iodate solution through the resin until the resin is saturated.

It would be desirable to develop additional methods to increase the amount or rate of iodine extraction, and to develop additional devices or apparatuses for implementing such methods.

BRIEF DESCRIPTION

Disclosed in various embodiments is an in-line mixing apparatus that can be used in extraction of iodine from an aqueous solution containing soluble iodine ions, such as brine. This apparatus is suitable for implementing a method for recovering iodine from an aqueous solution containing iodine ions by oxidizing the ions to iodine using hypochlorite ($OCl^{1-}$) and an acid, such as hydrochloric acid (HCl).

Previous iodine recovery processes resulted in large quantities of strongly acidic aqueous solution (with a pH of about 4 or lower) due to the acidification of the iodine-containing brine with a mineral acid, or due to the use of acidified iodate or other acidic solution. Disposal of such material is a major issue for any iodine recovery process. This acidic brine must also be treated with a basic compound, such as sodium hydroxide, prior to release to the environment. This treatment generates sodium chloride (i.e. salt) as a waste product.

Unlike previous methods, the methods and apparatuses of the present disclosure do not require solutions with pH values less than about 4 before the brine is absorbed by the resin, during the absorption process, or while stripping iodine from the resin. Instead, the pH may range from 6.0 to 6.8. The decreased acidity produces significantly less acidified extracted brine, consequently requiring significantly less sodium hydroxide and generating less salt. These methods thus have a significantly smaller environmental impact than existing processes. This improvement both decreases the number of materials needed to be brought to the site of iodine recovery and eliminates the need for a hazardous material.

In this regard, the present disclosure relates in particular to the use of an in-line mixing apparatus to convert iodide ions to iodine. This oxidation step requires efficient and rapid mixing for the chemical reaction to occur. The in-line mixing apparatus disclosed accomplishes this efficient and rapid mixing with no moving parts.

The in-line mixing apparatus comprises: an outer tube comprising a sidewall, a closed end, an open end, a first opening, and a second opening; and an inner tube comprising an inlet end, a closed end, and a sidewall, the sidewall having openings therein, the inner tube being located inside the outer tube.

The outer tube open end is generally adjacent the inner tube inlet end. Similarly, the outer tube closed end is generally adjacent the inner tube closed end. The inner tube and the outer tube may be coaxial.

The inner tube and the outer tube are usually cylindrical. The inner tube may have a diameter of from about one-half inch to about 6 inches, including a diameter of from about 2 inches to about 4 inches. The outer tube may have a diameter of from about 1 inch to about 10 inches, including a diameter of from about 4 inches to about 6 inches. A radial gap between the inner tube and the outer tube may have a length of from about 1 inch to about 4 inches, including about 1 inch. Generally, the radial gap is sized so that the linear velocity of fluid in the gap is approximately equal to the linear velocity of fluid in the inner tube.

The inner tube and the outer tube define an annular volume which has a cross-sectional area. A ratio of the cross-sectional area of the annular volume to the cross-sectional area of the inner tube may be from about 0.75 to about 3.

The inner tube sidewall openings may be circular, and may be arranged in a helical pattern on the inner tube sidewall. The inner tube sidewall openings may have an axis directed transversely towards the inner tube closed end. The inner tube sidewall openings may have a diameter of from about 0.125 inches to about 0.375 inches, including a diameter of about 0.25 inches. The inner tube sidewall openings have a total surface area, and the ratio of the total surface area of the openings to the inner tube cross-sectional area may be from about 0.75 to about 1.25.

In embodiments, the first opening is in the open end of the outer tube, and the second opening is in the sidewall of the outer tube. In other embodiments, the first opening is in the sidewall of the outer tube, and the second opening is in the open end of the outer tube.

The mixing apparatus may have a first feed tube in fluid communication with the inner tube inlet end and passing through the first opening in the outer tube, and an exit tube connected to the second opening. The first feed tube can join three fluid streams, such as brine/NaOCl/acid, together.

Alternatively, the mixing apparatus has a second feed tube in fluid communication with the annular volume between the inner tube and the outer tube. NaOCl and acid are fed into the inner tube, while brine is fed into the annular volume, and the two fluids are thoroughly mixed.

Also disclosed in other embodiments is an in-line mixing apparatus having an outer tube comprising a sidewall having a first opening therein, a closed end, and an open end having a second opening therein; and an inner tube comprising an inlet end, a closed end, and a sidewall, the sidewall having openings arranged in a helical pattern therein; and the inner tube being located coaxially inside the outer tube with the outer tube closed end being adjacent to the inner tube closed end.

Additionally disclosed is an in-line mixing apparatus, comprising: an inner tube comprising an inlet end, a closed end, and a sidewall, the sidewall having openings arranged in a helical pattern therein; and an outer tube surrounding the inner tube.

Also disclosed is an in-line mixing apparatus, comprising: an outer tube comprising a sidewall having a first opening therein, a first end, and a second end having a second opening therein; an inner tube comprising an inlet end, a closed end, and a sidewall, the sidewall having openings arranged in a helical pattern therein; a feed tube in fluid communication with the inner tube inlet end; and an exit tube. The inner tube is located coaxially inside the outer tube with the outer tube first end being adjacent to the inner tube closed end. In addition, either (i) the feed tube passes through the first opening of the outer tube and the exit tube is connected to the second opening of the outer tube or (ii) the feed tube passes through the second opening of the outer tube and the exit tube is connected to the first opening of the outer tube.

Methods of obtaining iodine from brine are also described, which include providing an in-line mixing apparatus. The in-line mixing apparatus has an inner tube comprising an inlet end, a closed end, and a sidewall, the sidewall having openings therein; an outer tube surrounding the inner tube and defining an annular volume; and a feed tube in fluid communication with the inner tube inlet end. A mixture of brine, NaOCl, and acid (such as HCl) is then fed through the feed tube into the inner tube. Pressure is applied to force the mixture through the openings into the annular volume, thereby causing the formation of elemental iodine in the brine as the brine passes through the in-line mixing apparatus. The elemental iodine is then separated from the brine to obtain the iodine.

These and other non-limiting aspects of the present disclosure are more particularly described below.

BRIEF DESCRIPTION OF THE DRAWINGS

The following is a brief description of the drawings, which are presented for the purpose of illustrating the exemplary embodiments disclosed herein and not for the purpose of limiting the same.

DETAILED DESCRIPTION

A more complete understanding of the components, processes, and apparatuses disclosed herein can be obtained by reference to the accompanying figures. These figures are merely schematic representations based on convenience and the ease of demonstrating the present development and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

Figure 1:
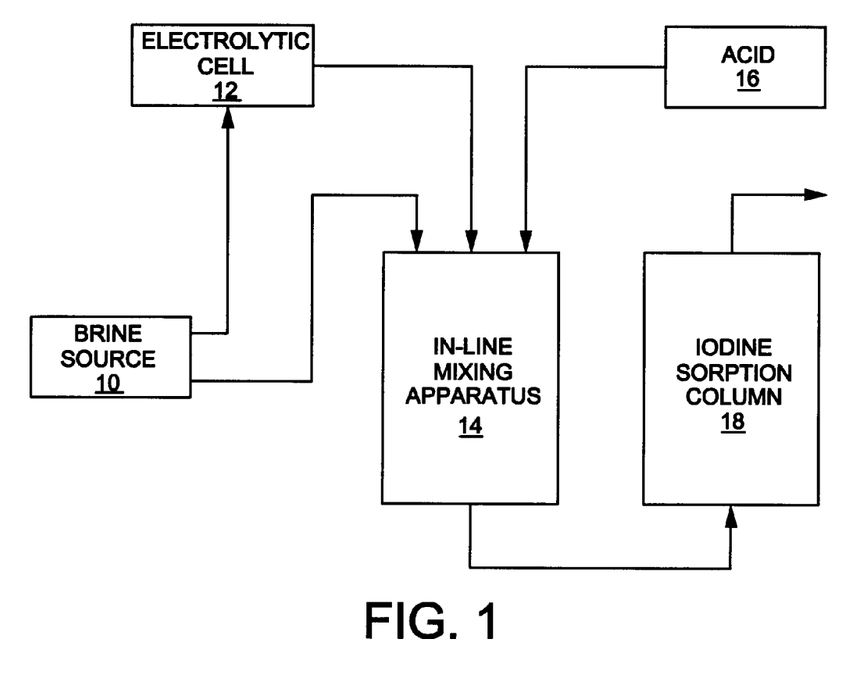
FIG. 1 is a flowchart showing an exemplary method useful in the present disclosure.

The apparatuses described herein are especially suitable for extracting iodine from brine. FIG. 1 is a flowchart showing a method of iodine extraction that is suitable for use herewith. Brine is transferred from a brine source 10 to an electrolytic cell 12 and an in-line mixing apparatus 14. The transfer may occur using an aqueous solution under pressure, such as when the brine source 10 is an artesian well, or the brine may be pumped. Preferably, the brine is filtered to remove dirt particles and other filterable impurities before reaching the electrolytic cell 12 and in-line mixing apparatus 14.

The electrolytic cell 12 receives brine from the brine source 10. Sodium chloride and water in the brine react in the electrolytic cell to produce sodium hypochlorite, commonly known as bleach, according to the following equations:

$$2NaCl + 2H_2O \rightarrow Cl_2 + H_2 + 2NaOH$$

$$Cl_2 + 2OH^{1-} \rightarrow Cl^{1-} + ClO^{-1} + H_2O$$

The amount of bleach produced is controlled by a combination of the amperage of the electrolytic cell and the flow rate of brine through the electrolytic cell 12.

Three different fluids then enter the in-line mixing apparatus 14: brine, NaOCl, and acid 16. Brine from the brine source 10 and brine containing NaOCl from the electrolytic cell 12 combine in the in-line mixing apparatus 14. Iodide in brine reacts with NaOCl to produce elemental iodine according to the following equation:

$$ClO^{1-} + 2H^{1+} + 2I^{1-} \rightarrow Cl^{1-} + H_2O + I_2$$

The production of iodine is monitored using a spectrophotometer. Elemental iodine is colored, and absorbance may be measured at 430 nm. A user may manually adjust the amperage of the electrolytic cell, controlling the amount of NaOCl reaching the in-line mixing apparatus, to maximize the production of iodine. Alternatively, an automated system may adjust the amperage of the electrolytic cell based on the measured absorbance of iodine to maximize the production of iodine with minimal or no human intervention.

The acid maintains the in-line mixing apparatus pH between 6.0 and 6.8 by adjustment. Acid is provided by the pH unit 16, a tank containing acid with a pump to transfer the acid to the in-line mixing apparatus 14. In embodiments, the acid is hydrochloric acid or sulfuric acid. In particulars embodiment, the acid is dilute hydrochloric acid.

Brine containing iodine is transferred from the in-line mixing apparatus 14 to an iodine sorption column 18. A single column or multiple columns can be used. Multiple columns may be connected in series, in parallel, or a combination of both.

In some embodiments, the column 18 contains a basic resin and acts as an ion exchange resin. Iodine in the brine is absorbed by the resin. Brine containing iodine is run through the resin until the resin is saturated and iodine can be detected in the eluent.

Iodine may be recovered from saturated resin by conventional techniques. One such technique of recovering iodine from a saturated resin is by elution with aqueous sodium hydroxide. For example, an aqueous solution containing about 10% sodium hydroxide may be passed through the column at a temperature of 55 to 65° C., preferably 60° C. Approximately 1-1.5 gallons of sodium hydroxide solution may be used for each pound of saturated resin.

The next step in recovering iodine from saturated resin is eluting the resin with an aqueous solution containing about 10% sodium chloride at 55 to 65° C., preferably 60° C., using a solution volume to the volume of aqueous sodium hydroxide solution. The resin is then regenerated to be reused in the present disclosure. In particular embodiments, the resin is regenerated by running a solution containing 10% sodium chloride and 0.33% NaOCl, adjusted to slightly acidic with hydrochloric acid, through the resin.

Iodine may be recovered from the sodium hydroxide and sodium chloride eluents by conventional techniques. Once such technique is to combine the eluents and acidify the mixture to a pH of about 0.5 to about 3 with hydrochloric acid, preferably a pH of 0.75. The mixture is then oxidized with NaOCl to form iodine precipitate.

Alternatively, the iodine sorption column 18 may be a column containing activated coconut carbon particles. Again, the brine containing iodine is run through the column until the activated coconut carbon is saturated and iodine can be detected in the eluent.

The saturated column is then treated with sulfur dioxide gas ($SO_2$) and water ($H_2O$) to extract the iodine. This treatment removes the iodine from the pores of the activated carbon particles, and the resulting products are hydrogen iodide (HI) and sulfuric acid ($H_2SO_4$). The hydrogen iodide can then be oxidized, for example with hydrogen peroxide, to obtain elemental iodine ($I_2$).

Figure 2:
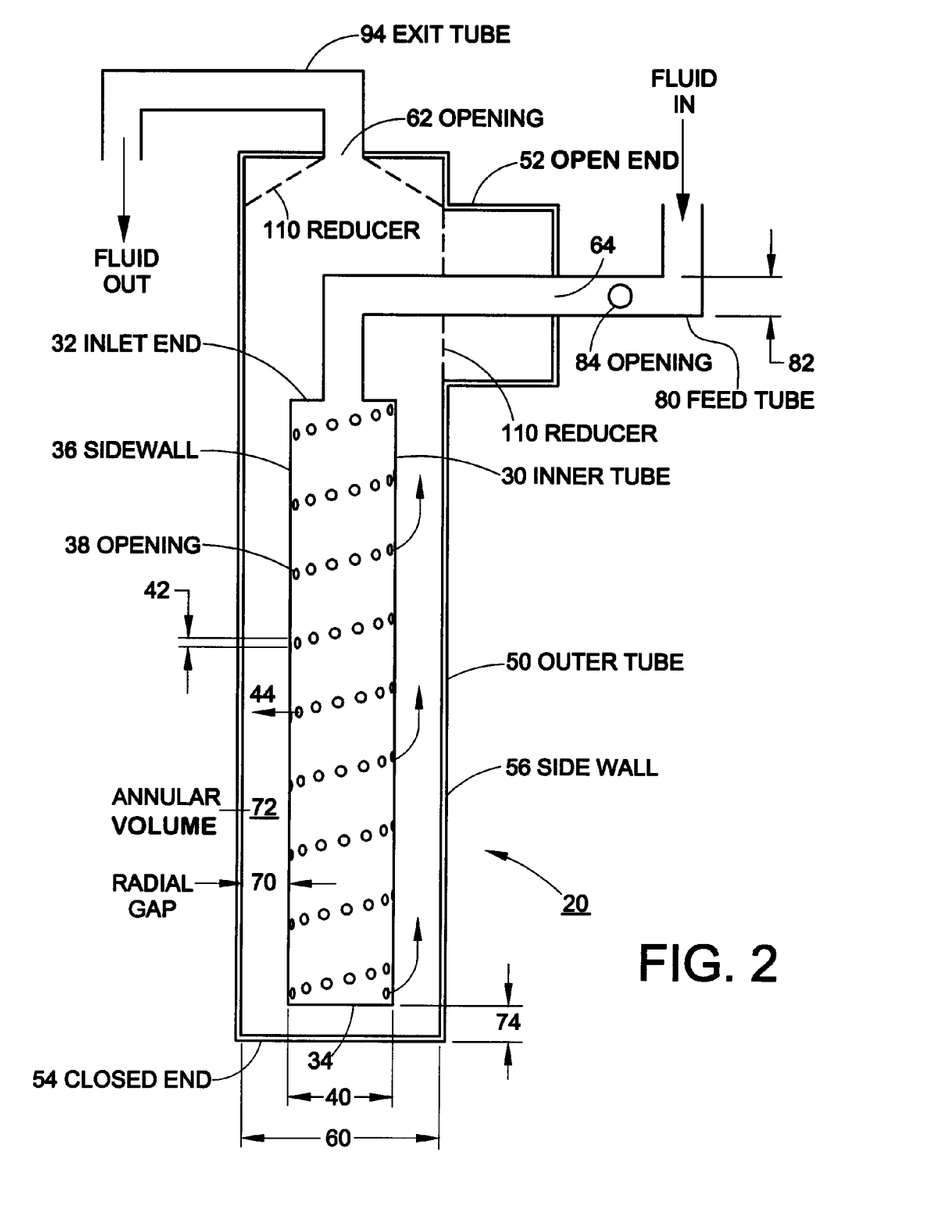
FIG. 2 is a side view of a first exemplary in-line mixing apparatus of the present disclosure.

FIG. 2 is a side view of an exemplary in-line mixing apparatus that is suitable for use as the in-line mixing apparatus of FIG. 1. The apparatus 20 comprises a fluid processing system for conveying or transmitting a fluid such as an inner tube 30 and an outer tube 50.

The processing system or inner tube 30 comprises an inlet end 32, a closed end 34, and a sidewall 36. The sidewall 36 defines an interior volume for the inner tube. There are apertures, perforations, holes, or openings 38 through the sidewall 36 to connect the interior volume with the exterior of the inner tube, as will be explained further herein. The closed end 34 may be sealed by, for example, a slip cap.

As depicted in FIG. 2, and in particular embodiments, the inner tube is cylindrical. However, it is possible that the inner tube may be of another shape. The inner tube may have a diameter 40 ranging from about one-half inch to about 6 inches, including a diameter from about 2 inches to about 4 inches.

Similarly, the openings 38 are depicted as circular, but may be of another shape as well. The openings 38 may have a diameter 42 ranging from about 0.125 inches to about 0.375 inches, including a diameter of about 0.25 inches. In particular embodiments, the openings all have the same size and shape. However, it is contemplated that the openings could vary independently in regards to size and shape, depending on the particular needs of the fluid process. As shown here, the openings are arranged in a helical pattern on the sidewall, which generally distributes the openings uniformly across the surface of the inner tube along both the length and the circumference. However, other patterns are also contemplated. Generally speaking, the pattern should insure uniform openings both around the circumference and the length of the inner tube. The openings are also shown as having an axis 44 perpendicular to the sidewall 36. However, the openings may also have an axis which is transverse to the sidewall, and in particular an axis directed towards the closed end 34 of the inner tube. This "downwards" exit axis can also encourage mixing, as explained further below. There may also be one or more openings 38 in the closed end 34.

The outer tube 50 comprises an open end 52, a closed end 54, and a sidewall 56. The sidewall 56 also defines an interior volume for the outer tube. The closed end 54 can also be sealed by, for example, a slip cap.

Again, as depicted in FIG. 2, and in particular embodiments, the outer tube is cylindrical. However, it is possible that the outer tube may be of another shape. The outer tube may have a diameter 60 ranging from about 1 inch to about 10 inches, including a diameter of from about 4 inches to about 6 inches.

The inner tube 30 is located inside the outer tube 50. Generally, they are placed to share a common axis, i.e. coaxially or so that there is a uniform distance between the inner tube and the outer tube. As a result, there is a radial gap 70 between the inner tube and outer tube. When both tubes are cylindrical, an annular area is formed between the two tubes. The radial gap may be from about 1 inch to about 4 inches, including about 1 inch. As a result of this placement, an annular volume 72 is defined by the inner tube 30 and the outer tube 50. The term "annular," as used herein, only designates the area or volume between the inner tube 30 and the outer tube 50, and should not be construed as requiring the inner tube and outer tube to have a circular cross-section. The inner tube and outer tube generally have the same shape (e.g., having a circular cross-section). However, it is contemplated that they could have different cross-sectional shapes. In such an event, the radial gap would be the shortest distance between the inner tube and outer tube. However, the inner tube and outer tube generally should never touch, i.e. there should be a gap between them around the entire inner tube.

In embodiments, the closed end 34 of the inner tube 30 does not contact the closed end 54 of the outer tube 50. In other words, there is a longitudinal gap 74 at the end of the tube. The longitudinal gap 74 is generally equal to or less than the diameter 40 of the inner tube. The length of the inner tube 30 may vary somewhat with the diameter 40. For example, with an inner tube diameter of two inches, the length is approximately three feet, while for an inner tube diameter of four inches, the length is approximately four feet.

The total surface area of the openings 38 is, in embodiments, about equal to the cross-sectional area of the inner tube 30 itself. The ratio of the total surface area of the openings to the cross-sectional area of the inner tube may be from about 0.75 to about 1.25, or from about 0.9 to about 1.1, and more specifically about 1. When this relationship is met, the velocity of the solution through each opening 38 is about equal to the velocity of the solution at the inlet end 32. For example, when the inner tube 30 has a diameter of two inches and each opening 38 has a diameter of ⅛ inches, there are a total of 60 to 65 individual openings. When the inner tube 30 has a diameter of four inches and each opening 38 has a diameter of ⅛ inches, there are a total of about 256 individual openings.

In embodiments, the cross-sectional area 76 of the annular volume 72 should be within an order of magnitude of the cross-section area 46 of the inner tube 30 in either direction (see FIG. 3), i.e. the ratio of the two cross-section areas is from 0.1 to 10. Again, it is generally desired that the velocity of the solution through the annular volume 72 is about equal to the velocity of the solution at the inlet end 32. However, in practice, tubes/pipes are usually only available with diameters in integral increments, such as 2 or 4 inches, not 2.5 inches. Thus, the ratio of the cross-sectional areas of the annular volume to the inner tube necessarily has greater variation. For example, the following table shows some possible combinations and their resulting ratio.

TABLE 1

| Outer tube diameter (inches) | Inner tube diameter (inches) | Annular volume cross-sectional area (in²) | Inner tube volume cross-sectional area (in²) | Ratio of areas |
|---|---|---|---|---|
| 4 | 2 | 12π | 4π | 3 |
| 6 | 2 | 32π | 4π | 8 |
| 6 | 4 | 20π | 16π | 1.25 |
| 8 | 6 | 28π | 36π | 0.78 |
| 8 | 4 | 48π | 16π | 3 |

In particular embodiments, the ratio of the cross-sectional area of the annular volume to the cross-sectional area of the inner tube is from about 0.75 to about 3. In further embodiments, the ratio is from 0.75 to 1.25, and generally should be as close to 1 as possible. In some particular embodiments, the inner tube has a diameter of from about 2 inches to about 4 inches and the outer tube has a diameter of from about 4 inches to about 6 inches.

As depicted in FIG. 2, the outer tube 50 has two openings 62, 64. In FIG. 2, one opening 62 is present in the open end 52 and one opening 64 is present in the sidewall 56. Generally speaking, the outer tube 50 has at least two openings, a "liquid feed" and a "liquid exit", for entry and exit of fluids. The two openings may be in any location that does not adversely affect the function of the apparatus 20. For example, both openings could also be in the sidewall 56.

FIG. 2 shows a first exemplary embodiment of an in-line mixing apparatus of the present disclosure. Here, first feed tube 80 passes through opening 64 and forms a fluid communication with (i.e. is connected to) the inlet end 32 of the inner tube 30. Generally speaking, the three fluid streams (brine, bleach, and acid) are combined in feed tube 80 prior to being transferred to the inner tube 30. As the amount of NaOCl and acid will generally be less than the amount of brine, their feed lines may be smaller. For example, as depicted here in FIG. 3, feed tube 80 has a diameter 82, which may be about 2 inches, and through which the brine initially flows. There are two openings 84, 86 in the feed tube for addition of NaOCl and acid, which can have a diameter of about 0.5 inches.

Figure 3:
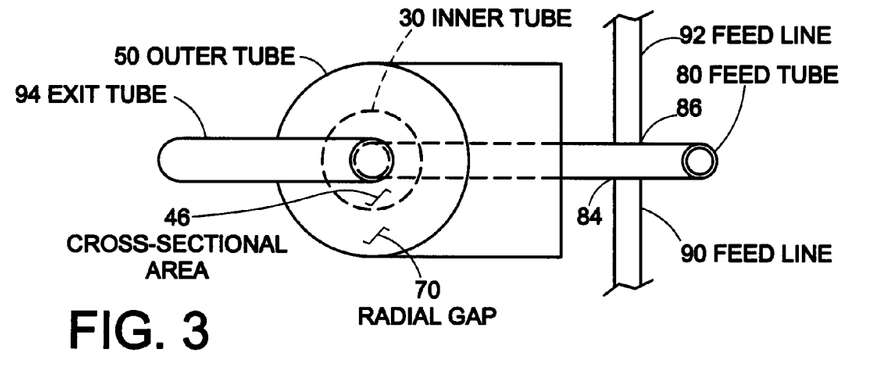
FIG. 3 is a top view of the exemplary apparatus of FIG. 2.

FIG. 3 is a top view of the mixing apparatus of FIG. 2. The inner tube 30 is shown within the outer tube 50. The feed tube 80 for the brine and the two smaller feed lines 90, 92 for the NaOCl and the acid are also visible. An exit tube 94 is attached to the open end 52 of the outer tube.

Referring again to FIG. 2, the in-line mixing apparatus is used to mix the brine, NaOCl, and acid. Feed tube 80 passes through opening 64 and connects to inlet end 32 of inner tube 30. As depicted here, the brine, NaOCl, and acid are mixed in the feed tube prior to entering the inner tube. However, it is also contemplated that feed tube 80 could act as a jacket for three separate feed lines and that the brine, NaOCl, and acid are not mixed until after entering the inner tube 30.

The brine, NaOCl, and acid solution enters the inner tube 30 under pressure, supplied for example by a pump (not shown) or by the artesian brine source. It then flows downwards through the inner tube 30 and out the openings 38 into the annular volume 72 under pressure. It should be kept in mind that during constant operation, annular volume 72 is full of solution as well. The resulting cascade of fluid being expelled from the inner tube 30, combined with impingement against the outer tube 50 and turbulence due to fluid flowing from closed end 54 upwards towards open end 52, causes thorough mixing of the brine, NaOCl, and acid to occur throughout the volume of fluid. Put another way, the initial downward flow of the solution at the inlet end 32 is continually and abruptly changed as the solution flows out the openings 38, wherein they encounter a counter-current upward flow. Each of the flow streams exiting the inner tube through openings 38 experiences continuous, instantaneous, and massive flow shear as a result, causing intimate mixing with little plug flow or laminar flow.

Exit tube 94 is attached to or passes through opening 62 on open end 52. The mixed fluid rises throughout the column and exits the apparatus 20 through exit tube 94.

Figure 4:
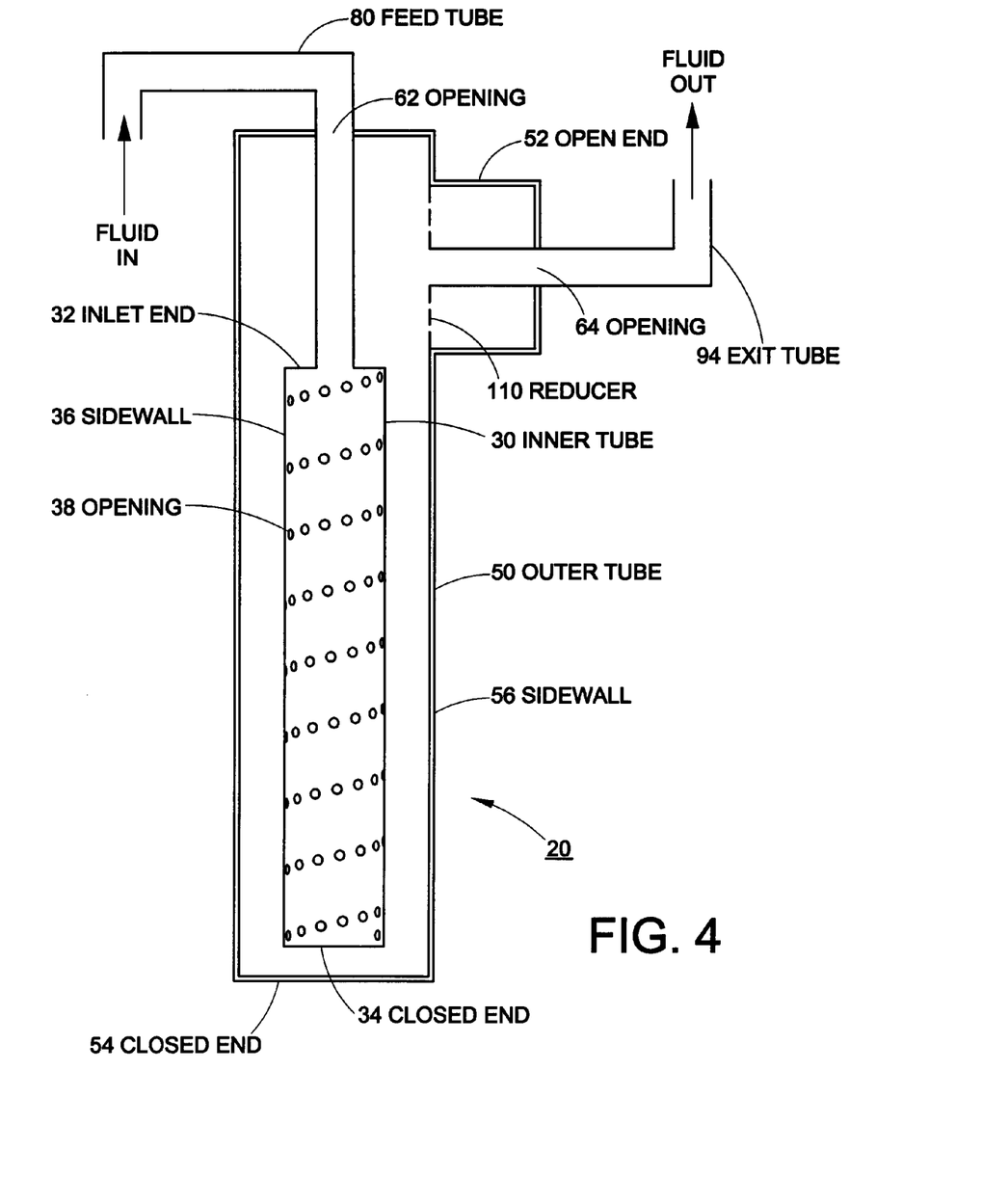
FIG. 4 is a side view of a second exemplary in-line mixing apparatus of the present disclosure.

FIG. 4 shows a second embodiment of an in-line mixing apparatus of the present disclosure. Here, feed tube 80 passes through opening 62 in the outer tube open end 52 and connects to inlet end 32 of inner tube 30. Liquid will flow downwards through the inner tube 30 and out the openings 38 into the annular volume 72. Exit tube 94 is attached to or passes through opening 64 in the sidewall 56 of outer tube 50. The mixed fluid rises throughout the column and exits the apparatus 20 through exit tube 94.

The in-line mixing apparatus can also be hooked up in series, with the exit tube of one apparatus being connected to the feed tube of the subsequent apparatus. This allows for scaling of the process as needed, and ensures total random and complete mixing.

As a result of the mixing, diatomic iodine or elemental iodine ($I_2$) is obtained from the brine originally containing ionic iodine, completely mixed and chemically reacted on exit from the in-line mixer. The $I_2$ and brine can then be sent to an anion-exchange resin for separation and purification of the $I_2$.

In embodiments, the open end 52 of the outer tube 50 is adjacent to the inlet end 32 of the inner tube. Put another way, they are located on the same end of the mixing apparatus, and their closed ends 34, 54 are located on the same end. Similarly, the minimum two openings 62, 64 in the outer tube 50 are generally located at the same end of the outer tube 50.

Generally, the apparatus 20 is aligned so that the closed ends 34, 54 are on the ground, i.e. the tubes are vertical. This decreases the footprint of the apparatus significantly. However, the apparatus could be aligned horizontally, but at significantly reduced efficiency due to the resulting change in fluid flow throughout the annular volume 72.

The outer tube 50 may contain various internal components to channel or control the fluid flow. For example, reducers 110 or other similar seals or bushing slips may be present that direct fluid from the annular volume 72 towards the exit tube 94 and reduce or prevent dead spaces in the outer tube 50. In other words, the fluid is not necessarily mixed through the entire volume of the outer tube 50. The apparatus is generally made airtight, for example by "collar welding" at the openings on the outer tube.

The various components of the in-line mixing apparatus can be made using known materials, such as various plastics. It is particularly helpful if the inner tube 30 and outer tube 50 are transparent, which aids in visual inspection and maintenance of the apparatus.

The in-line mixing apparatus described herein offers many advantages over conventional equipment. Compared to a conventional tank with agitator, the in-line mixing apparatus functions via pressure differential which is typically provided by natural flow or other equipment. As a result, no mechanical moving parts are required, no wearing out of mechanical equipment occurs, and very little maintenance or labor costs are required. Little or no sound is produced during use. There is no electrical power requirement, so the mixing apparatus can be used in remote areas. It is easily modified for use with hazardous or corrosive materials. The mixing apparatus has a much smaller footprint than a conventional mixing tank. Processing capacity is easily adjusted by either adding more apparatuses to a given tandem design (series or parallel) or by increasing the diameter of the mixing apparatus to increase the throughput. The capital expenditures for the mixing apparatus compare favorably to alternatives. The design is simple and easy to understand. Contrary to a mixing tank, the mixing improves as the throughput increases. Because the mixing apparatus is sealed and self-contained, there is no possibility of hazardous vapors (such as hydrocarbons) escaping from the fluid and no need for air exchange to prevent explosive conditions around the mixing apparatus. The apparatus is easily cleaned by a contained flush, without the need to enter a mixing vessel for maintenance or cleaning. The mixing apparatus can be mounted in any direction or configuration as well, and can be moved or replaced within minutes.

Figure 5:
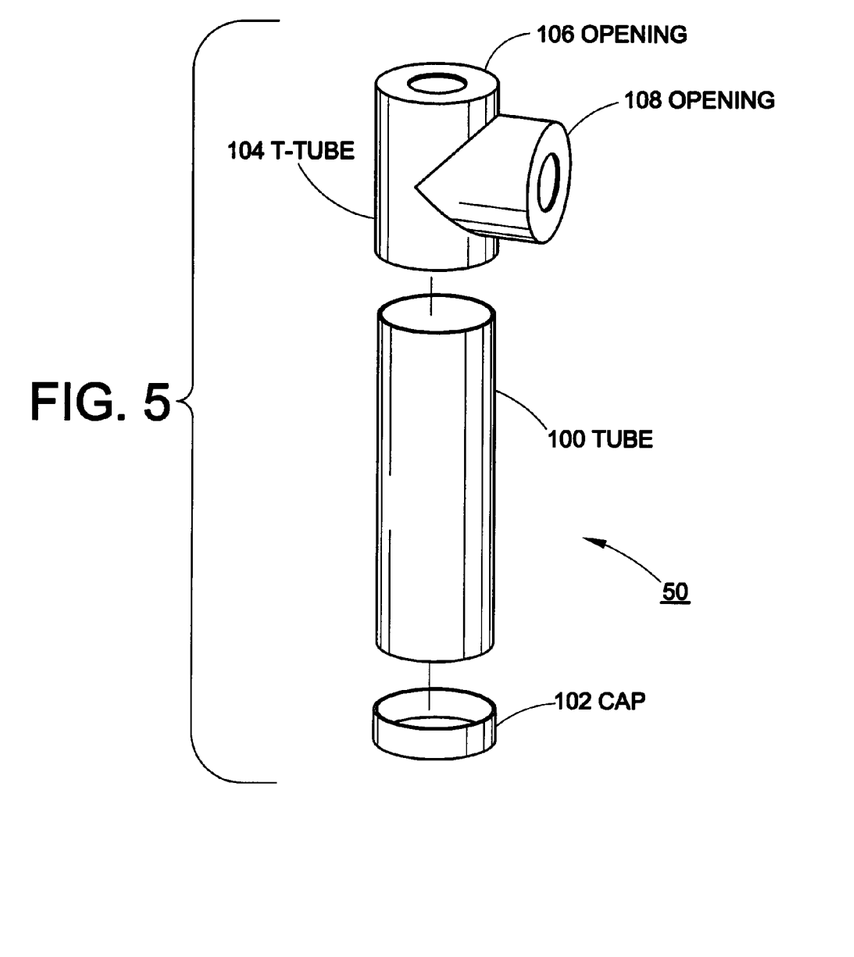
FIG. 5 is an exploded diagram of components for making part of an exemplary in-line mixing apparatus of the present disclosure.

While described here in terms of separate components, it is contemplated that the various components described herein may be made integral with each other, or may be assembled from smaller components. For example, outer tube 50 could be made from a combination of, for example, a tube 100, a cap 102, and a T-tube 104 that attaches to tube 100 with one opening and provides the two openings 106, 108, as partially illustrated in FIG. 5.

EXAMPLE

Four in-line mixers were connected in series. Each in-line mixer was made from an inner tube having a diameter of two inches and an outer tube having a diameter of four inches. Brine was flowed through the in-line mixers at a rate of 50 gallons per minute, and the brine contained 50 ppm iodine. Stoichiometric amounts of NaOCl and HCl were injected into the brine at the inlet of the mixer. Chemical analysis showed the desired mixing was over 95% completed after the first in-line mixer, and 100% complete after the second in-line mixer.

At a flow rate of 50 gallons per minute, the flow velocity through the two-inch diameter inner tube was just over 60 inches per second. The nominal distance between the inlet of the first in-line mixer and the outlet of the second in-line mixer was 120 inches, so the 100% mixing was completed in less than 5 seconds. Flow rates between 30-60 gallons/minute were tested, and the mixing apparatus is believed to be able to accommodate flow rates of up to 200 gallons/minute.

The apparatuses and methods of the present disclosure have been described with reference to exemplary embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An in-line mixing apparatus for extracting iodine and soluble ions thereof from a brine solution, comprising:
   a cylindrical outer tube comprising a sidewall, a closed end, an open end, a first opening, and a second opening; and
   a cylindrical inner tube comprising an inlet end, a closed end, and a sidewall, the sidewall having openings therein, the inner tube being located inside the outer tube and having a cross-sectional area;
   wherein the outer tube closed end is adjacent the inner tube closed end, the outer tube closed end and the inner tube closed end being separated by a longitudinal gap.

2. The mixing apparatus of claim 1, wherein the outer tube open end is adjacent the inner tube inlet end.

3. The mixing apparatus of claim 1, wherein the inner tube has a diameter of from about 2 inches to about 4 inches.

4. The mixing apparatus of claim 1, wherein the outer tube has a diameter of from about 4 inches to about 6 inches.

5. The mixing apparatus of claim 1, wherein the inner tube has a diameter of from about 2 inches to about 4 inches and the outer tube has a diameter of from about 4 inches to about 6 inches.

6. The mixing apparatus of claim 1, wherein the inner tube and the outer tube are coaxial.

7. The mixing apparatus of claim 1, wherein the inner tube sidewall openings are circular.

8. The mixing apparatus of claim 1, wherein the inner tube sidewall openings are arranged in a helical pattern on the inner tube sidewall.

9. The mixing apparatus of claim 1, wherein the inner tube sidewall openings have an axis directed transversely towards the inner tube closed end.

10. The mixing apparatus of claim 1, further comprising a first feed tube in fluid communication with the inner tube inlet end and passing through the first opening of the outer tube, and an exit tube connected to the second opening of the outer tube.

11. The mixing apparatus of claim 1, wherein the first opening of the outer tube is located in the open end, and the second opening of the outer tube is located in the sidewall.

12. The mixing apparatus of claim 1, wherein the inner tube sidewall openings have a total surface area, and the ratio of the total surface area of the openings to the inner tube cross-sectional area is from about 0.75 to about 1.25.

13. The mixing apparatus of claim 12, wherein the ratio of the total surface area of the openings to the inner tube cross-sectional area is about 1.

14. The mixing apparatus of claim 1, wherein an annular volume is defined between the inner tube and the outer tube, and a cross-sectional area of the annular volume is within an order of magnitude of the cross-sectional area of the inner tube.

15. The mixing apparatus of claim 1, wherein the longitudinal gap is equal to or less than a diameter of the inner tube.

16. An in-line mixing apparatus for extracting iodine and soluble ions thereof from a brine solution, comprising:
- an outer tube comprising a sidewall, a closed end, an open end, a first opening, and a second opening; and
- an inner tube comprising an inlet end, a closed end, and a sidewall, the sidewall having openings therein, the inner tube sidewall openings having an axis directed transversely towards the inner tube closed end, the inner tube being located inside the outer tube and having a cross-sectional area;
- wherein the outer tube closed end is adjacent the inner tube closed end, the outer tube closed end and the inner tube closed end being separated by a longitudinal gap.

* * * * *